Inventor:
Hans Dröll
Willi Muskulus

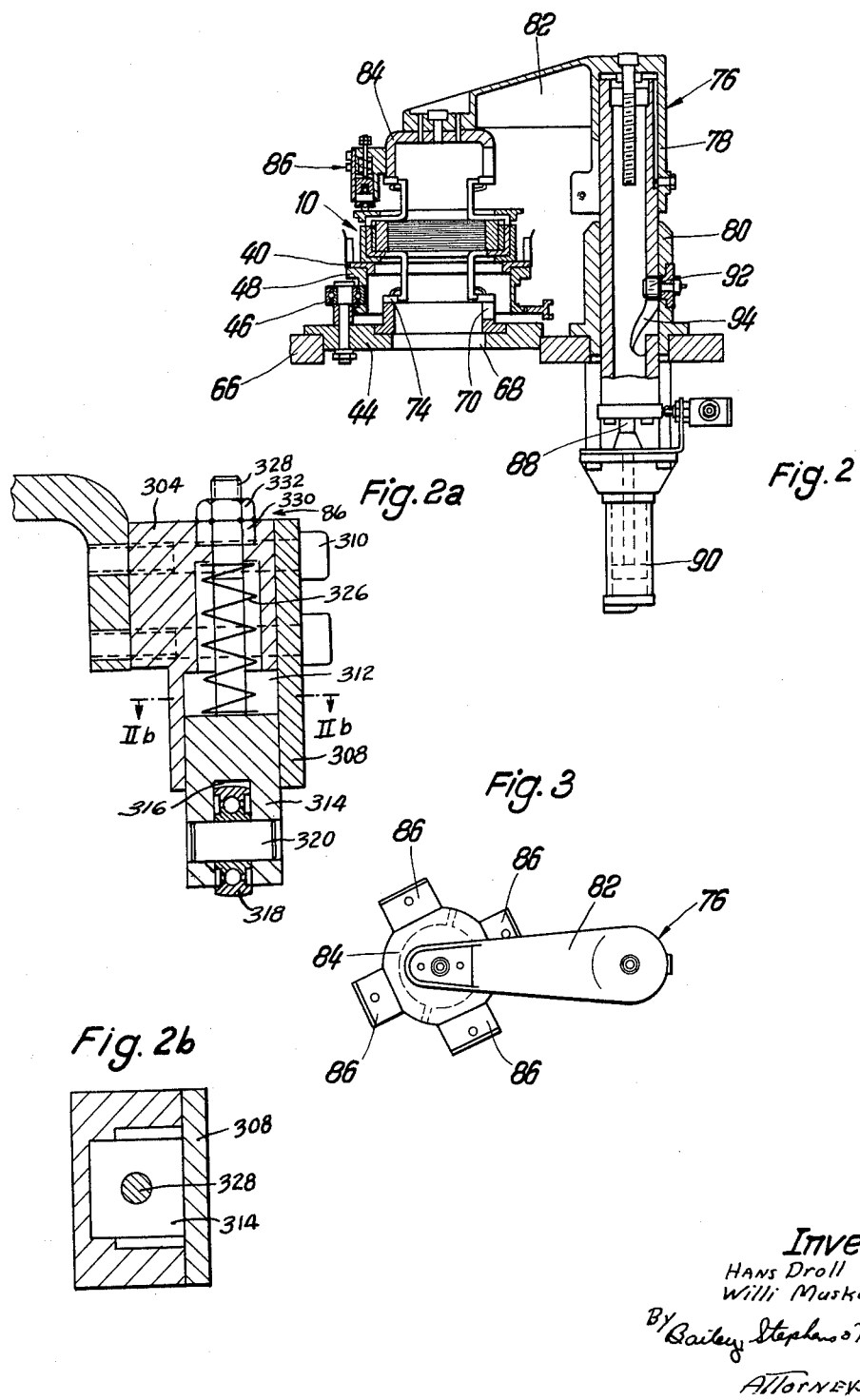

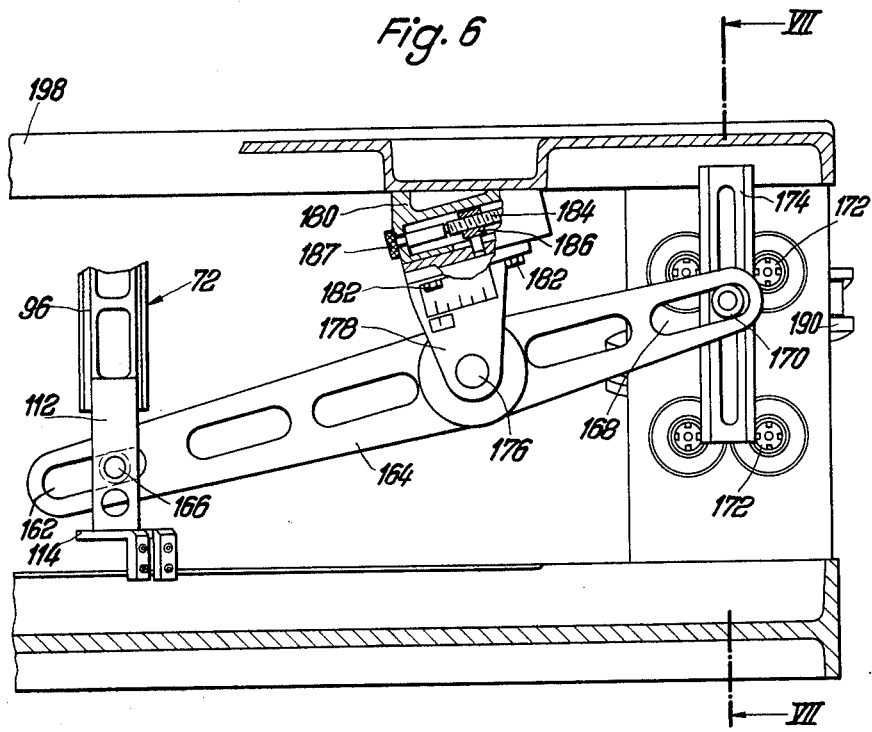
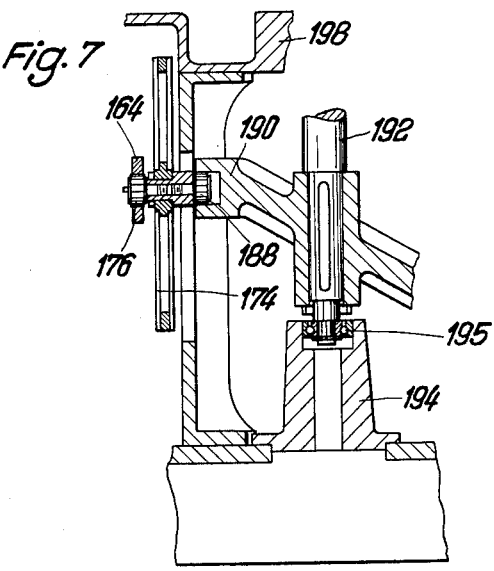

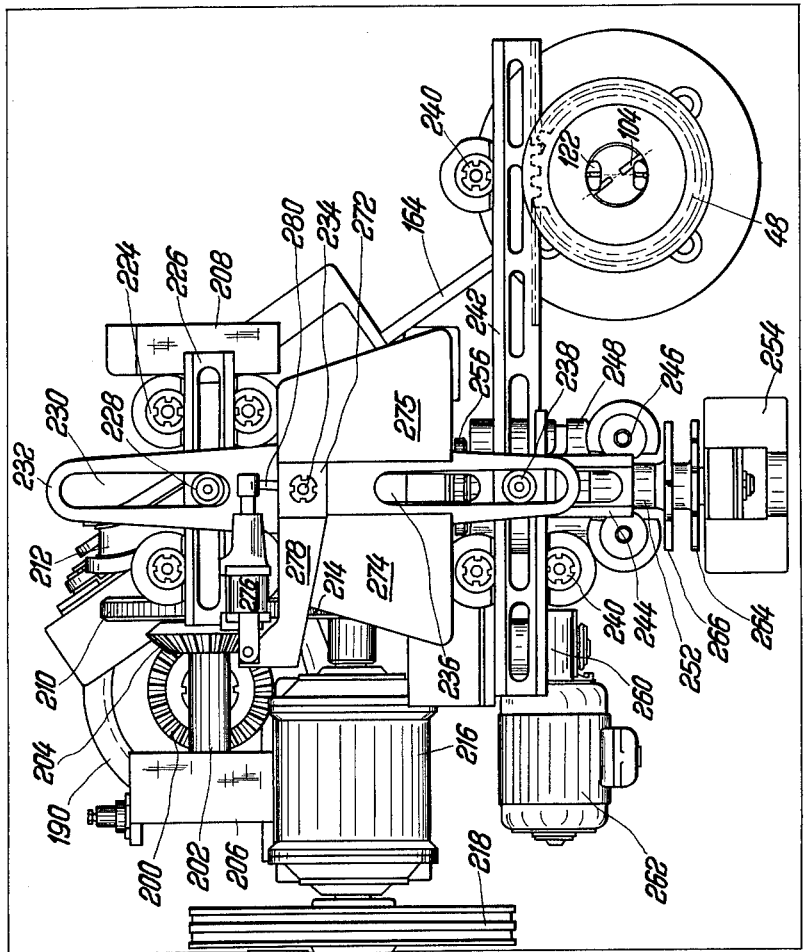
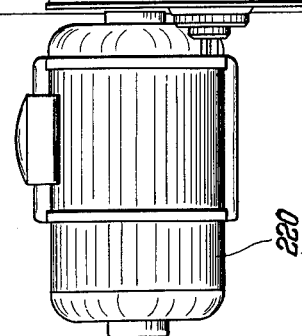
Fig. 10
Inventor:
Hans Dröll
Willi Muskulus

Dec. 28, 1965   H. DRÖLL ETAL   3,226,046
DEVICE FOR WINDING AN ANNULAR ARTICLE
HAVING INWARDLY DIRECTED SLOTS
Filed July 17, 1962   10 Sheets-Sheet 8
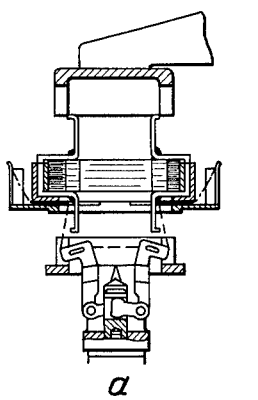
a
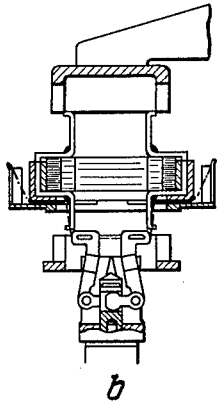
b
Fig. 11
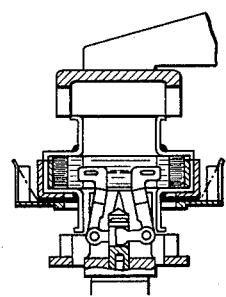
c
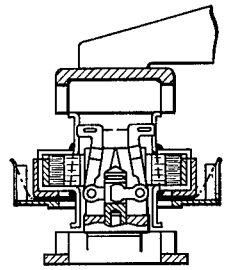
d
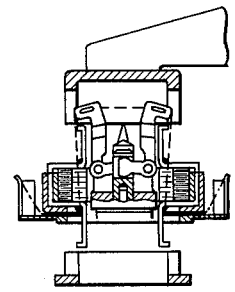
e
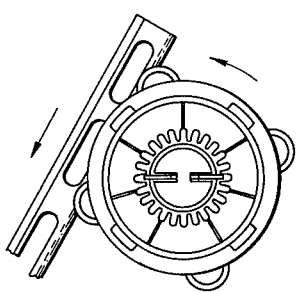
f
Inventor:
Hans Droll
Willi Maskulus
By Bailey, Stephens-Huettig
Attorneys

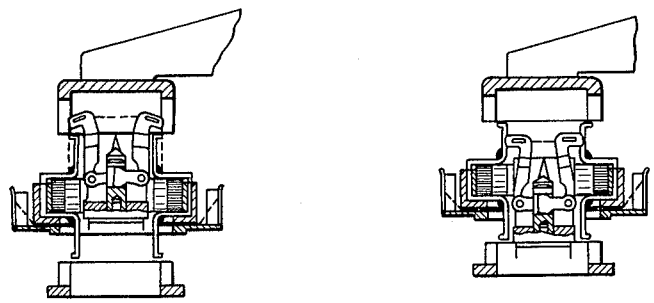
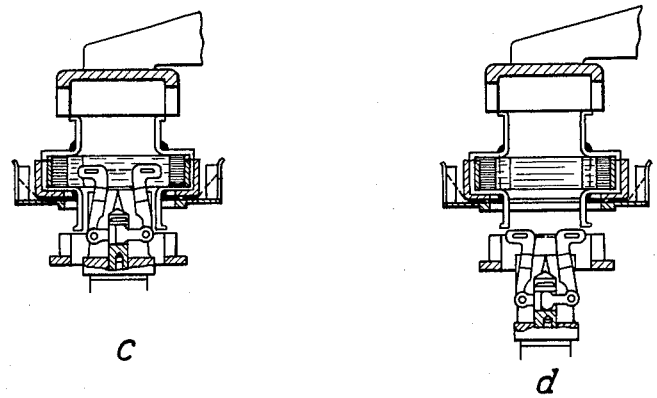
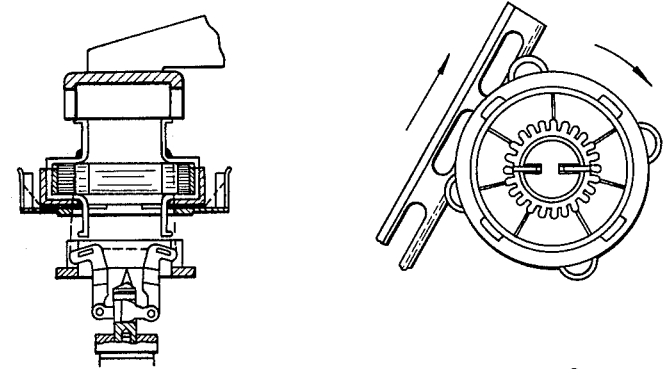
Fig. 12

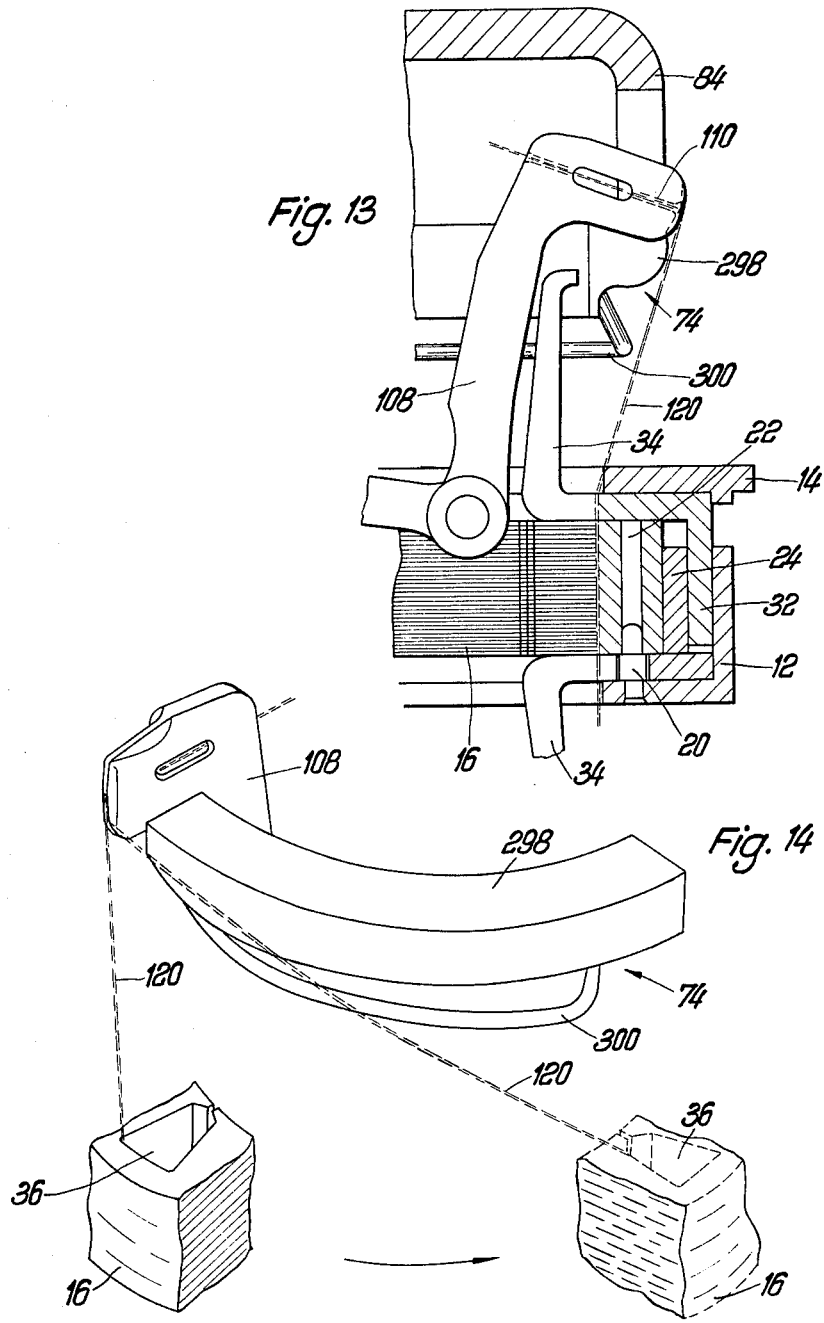

United States Patent Office 3,226,046
Patented Dec. 28, 1965

3,226,046
DEVICE FOR WINDING AN ANNULAR ARTICLE HAVING INWARDLY DIRECTED SLOTS
Hans Dröll and Willi Muskulus, Bergen-Enkheim, Germany, assignors to Balzer and Droll, Schnitt- und Werkzeugbau, Bergen-Enkheim, Germany, a German firm
Filed July 17, 1962, Ser. No. 210,480
Claims priority, application Germany, July 21, 1961, B 63,349
3 Claims. (Cl. 242—1.1)

The invention relates to a method of, and apparatus for, mechanically winding slotted stator sheet stacks in electric machines having stationary poles.

In a known coiling machine for winding stator sheet stacks of comparatively small polyphase motors, the wire is slung over a roller at the top end of a slide which is axially movable through the stator bore and is rotatable by a winding step width when outside the stator bore and around fingers arranged on both sides of the stator by which fingers it is pulled outwardly radially into the slots to be wound. Those slots which are not to be wound are covered in the stator bore by a cylindrical inset provided with longitudinal slots. When one coil has been completed, the stator sheet stack is rotated relatively to the inset by a distance corresponding to one or more teeth. However, this method can only be applied to windings whose coils have the same width throughout, as they occur almost exclusively in polyphase motors, and cannot be applied to universal motors having stationary poles, which are employed mainly for domestic machines and refrigerators. Moreover, the winding of a stator requires a comparatively long time, because the coils have to be wound singly, one after another.

It has also been proposed to use for the winding of slotted stators with stationary poles several winding needles fixedly arranged on the periphery of a needle carrier, moved axially through the stator bore, and engaging radially in the slots to be wound, by means of which the wire strands, issuing from radially extending needle eyes, are guided in an axial direction through the slots and a certain distance beyond. When the needles are outside the slots, the sheet stack and the winding needles are rotated relatively to one another through the required step width and the wire strands are engaged around guide projections extending in an axial direction and tapering downwardly towards the free end, the wire strands being pulled past the rounded outer surfaces of these projections in the direction towards the stator during the return movement of the needle carrier, thus forming the coil end. The guide projections are fastened to the stator sheet stack by attachment screws whereby the sheet stack may easily suffer damage, and the resulting increase of iron losses may lead to the excessive heating of the stator during operation. The insulation of the wire may easily be damaged by the violent pulling back of the wire strands over the rounded outer surfaces of the guide projections which increase in diameter in the direction towards the stator, and short-circuits in the windings are possible.

The invention has for its object to overcome these disadvantages and according to the invention there is provided a method for the mechanical winding of slotted stator sheet stacks of electric machines with stationary poles by means of at least two winding needles engaging the slots to be wound and each guiding a wire strand in a reciprocating movement through the slots and beyond them, the sheet stack being pivoted relatively to the winding needles when these are outside of the grooves in accordance with the desired width of the winding step and the wire strands being held radially outside the stator bore by guide means, characterized in that the winding needles when outside the slots are subjected to a radially outward movement and the wire strands which emerge radially from the needle eyes are laid during the relative displacement around detachable winding fingers which extend from each tooth head in substantially axial direction on both sides of the stator sheet stack, during which operation the wire strands which extend from the slots to the needle eyes are engaged by wire deflectors which are fixed relative to the winding needles and as regards the relative pivoting movement, and which are curved co-axially with the stator sheet stack, so that these wire strands are urged outwardly.

According to a further feature of the invention a device for carrying out the method of the invention comprises a holding device for receiving the stator sheet stack to be wound and the winding fingers, a machine frame, an actuating disc rotatably arranged on the machine frame and provided with a central aperture on which disc the holding device can be placed, means for pressing the holding device against the actuating disc, means for the non-rotatable connection of the actuating disc to the stator sheet stack and the winding fingers, a needle carrier capable of executing reciprocating movements in the axial direction of the actuating disc and through its central aperture, a head of the needle carrier to which the winding needles, which are provided with eyes, are hinged so as to be outwardly pivotable in an axial plane of the needle carrier, means for feeding the wire strands to the needle eyes, wire deflectors positioned at both end faces of the holding device and fixed to the actuating disc and to the means for holding down the holding device and curved co-axially with respect to the stator sheet stack, means for actuating the movement of the needle carrier, means for rotating the actuating disc in either direction when the needle carrier is in either dead centre position and means for pivoting the winding needles outwardly and inwardly in a radial direction in dependence upon the movement of the needle carrier.

The invention will now be described with reference to the accompanying drawings illustrating one embodiment of the invention and in which:

FIGURE 2 is a longitudinal section of the holding device placed upon the winding machine, and guided on the machine bench;

FIGURE 2a is an enlargement of a part of FIGURE 2;

FIGURE 2b is a cross-section on the line IIb—IIb of FIGURE 2a;

FIGURE 3 is a plan view of the holding-down device of FIGURE 2;

FIGURE 6 is a part-sectional side elevation of the drive mechanism for the needle carrier;

FIGURE 7 is a section taken on the line VII—VII of FIGURE 6;

FIGURE 10 is a plan view of the winding machine, without the machine bench and the intermediate plate, and with the actuating disc omited;

FIGURES 11a–e and FIGURES 12a–e respectively are sectional views of the holding device, the stator sheet stack and the needle head, in which the winding needles are shown in the different stages of the winding operation;

FIGURES 11f and 12f show respectively in plan view the holding device containing the stator sheet stack, during further stages of the winding operation;

FIGURES 13 is a section drawn to an enlarged scale of part of the holding device including one winding needle; and FIGURE 14 is a perspective view of the wire deflector and of one winding needle, with the wire and the stator sheet stack shown in two different positions.

Figure 1:
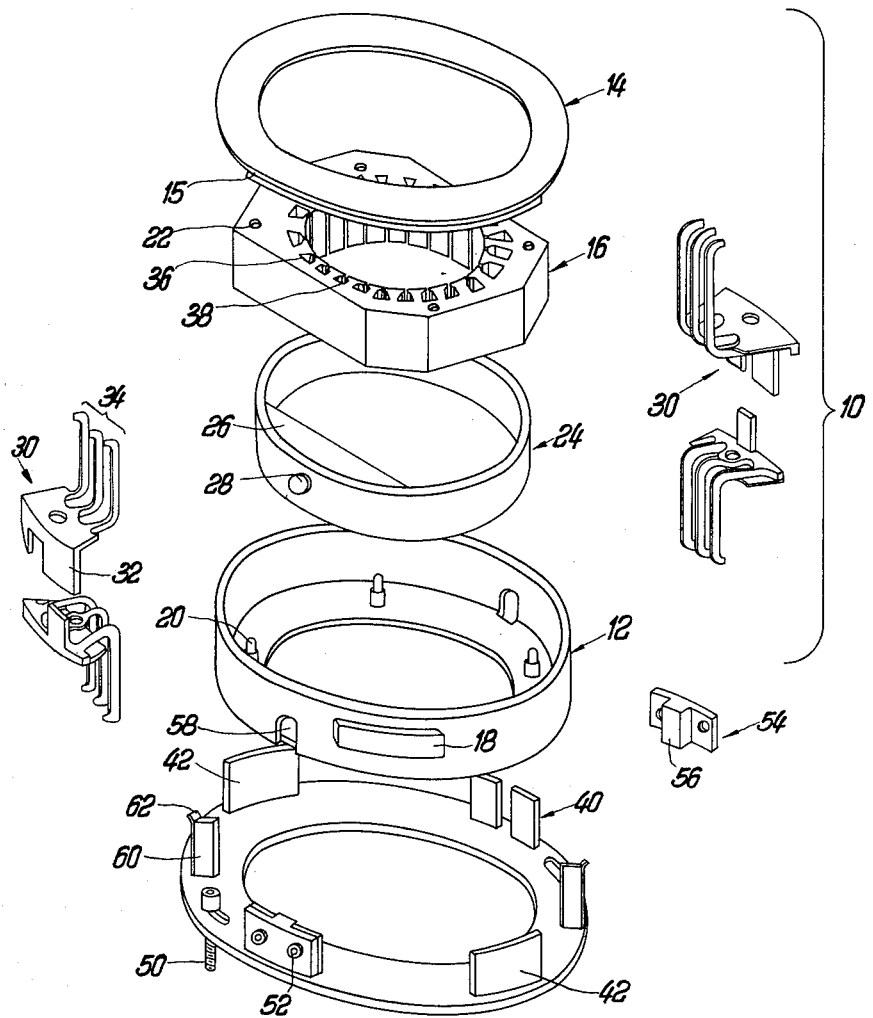
FIGURE 1 is an exploded perspective view of a holding device for the stator sheet stack which is to be wound.

The stator jig 10, of which FIGURE 1 gives an exploded view, comprises a bottom part 12 having the shape of an annular cup and a top part 14 in the shape of an annular disc adapted to overlie the bottom part and having a centering collar 15 of an inner diameter identical to that of the bottom part 12. When assembled, the bottom part 12 and the top part 14 form in effect a ring of U-shaped cross section, the arms of the U extending inwardly in radial direction, said ring housing the stator sheet stack 16 which is to be wound. The bottom part 12 is provided on its outer peripheral surface with two diametrically opposing grips 18. Arranged on the bottom of the lower part 12 are four guide pins 20 having enlarged base portions and which extend in an axial direction to engage in auxiliary bores 22 in the stack 16 which is supported in spaced relation to the bottom part 12 by the enlarged base portions of the pins 20.

Around the peripheral surface of the stator sheet stack 16 is placed a support ring 24 which bears with at least one rigidly connected guide segment 26 on a flattened portion of the peripheral surface of the stack 16 and, in this way, establishes a non-rotational connection between the stack 16 and the support ring 24.

The outer periphery of the support ring 24 is surrounded with a double crown of winding finger segments 30 (see also FIGURE 13) which are non-ratably held relatively to the support ring 24 by means of a projection 28 on the outer surface of the support ring 24 which engages in an aperture in the segments 30. The winding finger segments 30 interlock axially in a tooth-like manner with their root portions 32 and are provided with a plurality of winding fingers 34 on each segment which, on each end face of the stator sheet stack 16, extend inwardly in radial direction, along the teeth 38 of the sheet stack which separate the stator slots 36, up to about the stator bore in which location they are bent in axial direction, level with the teeth heads. The free ends of the winding fingers are bent radially outwardly. The bottom part 12 and the top part 14 hold the winding finger segments 30 in their position on the stator sheet stack 16, i.e. against the support ring 24, and form a unitary assembly in conjunction with these parts, as may be seen in FIGURE 13.

During the winding operation, the jig 10 which holds the stator sheet stack 16 is placed upon an annular actuating disc 40, attached to the winding machine and provided with centering jaws 42, said actuating disc being fastened with screws 50 (FIGURE 1) to the upper side of a ring gear 48 which is supported on an intermediate plate 44 between stationary guide rollers 46 so as to be rotatable about a vertical axis (as may be seen in FIGURE 2). Two of the centering jaws 42 are slotted throughout in axial direction and carry catch elements 54, fitted from the outside and fastened by means of screws 52, said elements penetrating with key projections 56 through the slots provided in the centering jaws 42 and beyond the inner edge of the latter. When the stator jig is placed upon the actuating disc 40, the key projections 56 engage the slots 58 in the bottom part 12 and establish a non-rotatable connection between the bottom part 12 and the actuating disc 40.

The actuating disc 40 is also provided on its upper surface with projections 60 on which flat springs 62 press under the influence of their own tension, the springs being fastened at the bottom end of these projections. These springs, together with the projections 60, serve for clamping the ends of the winding wire, as will hereinafter be explained.

Figures 4, 5:
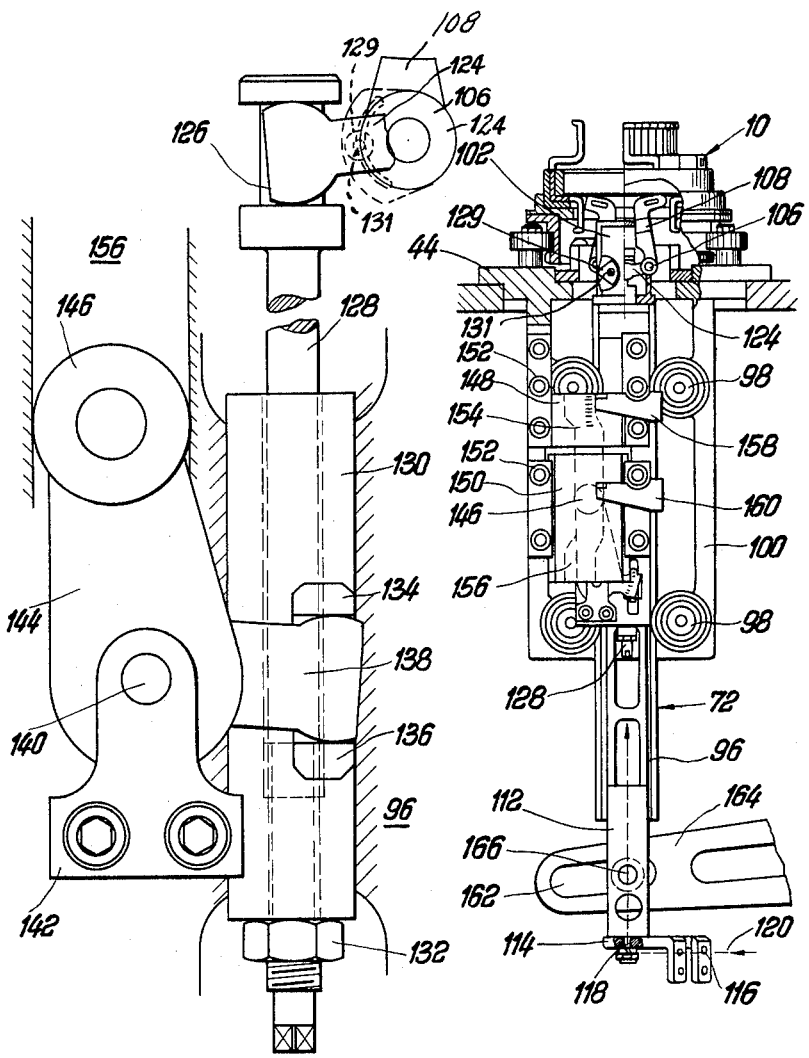
FIGURE 4 is a part-sectional side elevation of the winding machine, showing the needle carrier for the winding needles, and with the holding-down device omitted.
FIGURE 5 is an enlarged detail of FIGURE 4 in part-sectional view.

The intermediate plate 44 has a raised centering portion with which it engages an aperture of the machine bench 66 (FIGURE 2) and is screw-fastened to the latter in suitable manner. The intermediate plate 44 is provided, within the spur gear 48, with a circular aperture 68 comprising a milled centering recess in which a collar-like inset 70 is placed. This inset comprises an upright sleeve portion through which the vertically reciprocating needle carrier 72 of the winding machine can move (FIGURE 4.) The sleeve portion of the inset 70 is provided with axially extending longitudinal slots in accordance with the number of winding needles, as will hereinafter be explained in further detail and supports, on its upper end face, two deflectors 74 which extend between oppositely located slot edges along the edge of the end face as will be also described in further detail hereinafter.

The stator jig 10 is held to the actuating disc 40, which latter is positively connected to the machine, by a holding-down device, indicated in its entirety by the reference numeral 76 (FIGURE 2). This consists substantially of a sleeve portion 78 which is guided in axially displaceable manner in a guide 80 positively connected to the machine bench, and of a radial arm 82 attached to the sleeve portion and supporting a cup-shaped pressure head 84 at the free end of said arm. The cylindrical portion of the cup-shaped pressure head 84 is the inverse counterpart of the slotted sleeve portion of the collar-like inset 70 and is likewise provided on its lower end face with two deflectors 74 which extend from two oppositely located slot edges along the edge of the end face.

A plurality—preferably four—of pressure elements (FIGURE 3) are distributed over the periphery of the pressure head 84 and attached to its cylindrical outer surface by means of screws. Each pressure element 86 consists of a housing 304. A cover plate 308 is secured to the housing 304 by means of screws 310 which pass through correspondingly threaded bores in the pressure head 84. The housing 304 and the cover plate 308 form together a chamber 312 of rectangular cross section in which a piston-like holder 314 is mounted for slidable up and down movement. A recess 316 is provided in the holder 314. In the recess 316 there is arranged a roller bearing 318 fixed to the holder by means of a bolt 320. The roller bearing 318 engages the top part 14 of the stator jig 10 and firmly presses it down against the winding finger segments 30. The upper part of the chamber 312 is cylindrically formed and contains a helical pressure spring 326 which acts between the upper end of the chamber 312 and the holder 314 forcing the latter in a downward direction. To prevent escape of the holder 314 from the chamber 312 a pin-like prolongation 328 extends from the upper face of the holder 314 and passes through the helical spring 326 and a bore in the housing 304. The upper end of the prolongation or pin 328 is threaded and is provided with two nuts 330 and 332 countering each other, the lower one of which engages the upper surface of the housing 304 when the holder 314 is moved down a predetermined distance by means of the spring 326, thus preventing the holder 314 from escaping out of the chamber 312.

The pressure head 84, which is non-rotatably connected to the arm 82, can be moved from the operative position shown in FIGURE 2 upwardly and out of contact with the stator jig 10 by means of a two-way pneumatic drive 90 which acts upon the sleeve portion 78 via a piston rod 88. A rotatable guide roller 92 which extends inwardly in radial direction from the guide 80 engages in a substantially axial guide slot 94 in the sleeve 78. The lower end of the guide slot 94 is inclined at an angle to the axis of the sleeve whereby a rotary movement is imparted to the holding-down device 76 on completion of its upward travel which causes the arm 82 with the pressure head 84 to be pivoted out of the position in which it is co-axial with the stator jig 10. When the penumatic drive 90 is actuated in the reverse direction, the arm is pivoted back into position co-axial with the stator jig 10 and thereupon the entire holding down device is lowered, until the pressure elements 86 resiliently contact the upper part 14 of the stator jig. As can be seen in FIGURE 4, the needle carrier 72 consists mainly of a flat rail 96 of profiled section which can be moved up and down between pairs of guide rollers 98 disposed on both sides of the rail. The guide rollers 98 are rotatably supported by a depending frame 100 which is attached to the underside of the intermediate plate 44 and cast integrally therewith. The flat rail 96 carries at its upper end a needle head 102 in the form of a hollow cylinder closed top and bottom which, in accordance with the number of pole pairs of the stator sheet stack to be wound, is provided with one or several pairs of radial slots displaced by 180° and extending from the upper edge nearly to the lower edge of the needle head (FIGURE 10). In each of these radial slots is arranged a flat winding needle 108, outwardly bent in radial direction at its free end and at the other end pivotable about a needle pin 106, its bent end portion being provided with a radial bore which forms the eye 110, (FIGURE 13).

At the lower end of the flat rail 96 two flat extensions 112 are fitted at either side thereof which form a fork, a wire guide 114 being screwed to their lower edge. This guide is provided with horizontal and vertical bores 116 and 118, roundedly tapered and polished on both sides, through which the winding strands 120 arriving from coils (not shown) are fed along the flat rail 96 into the needle head 102 where they are deflected in the direction of the needle eyes 110 by guide grooves 122 (FIG. 10).

Non-rotatably connected to each winding needle 108 is a lever 124 which extends inwardly from the hinge point of the needle in substantially radial direction and whose spherical end matchingly engages a common annular groove 126 at the enlarged top end of a push rod 128 (FIGURE 5). Each needle hinge 106 is supported on an associated eccentric 129 which pivots about a set screw 131 screwed into a threaded bore in the needle head 102 and can be clamped within a predetermined pivoting range. This provides for each winding needle a separate fine-adjustment of its pivoting range relatively to the stroke of the push rod 128, and this allows compensation of the needle movements, particularly relatively to one another.

The push rod 128 is supported in the centre portion of the flat rail 96 so as to be axially displaceable and rotatably and is provided at its lower end with a thread screwed into a non-rotatably guided square element 130 and secured by a lock nut 132. On one side the square element 130 is provided, in axially spaced relationship, with two projections 134 and 136 between which a drive lever 138 can matchingly engage (FIGURE 5). The lever 138 which extends substantially in radial direction is pivotably hinged by means of a pin 140 to a bearing plate 142, fixed to the flat rail 96, and non-rotatably connected to an upwardly extending control lever 144. A guide roller 146, which is rotatably connected to the free end of the control lever 144, engages a control cam, cut into two cam plates 148 and 150 and, due to its shape, is positively held in said control cam. The cam plates 148 and 150 are clamped to the depending frame 100 by means of clamp screws 152 and can be vertically displaced relatively to each other and relatively to the frame. Into each cam plate 148 and 150 respectively is cut a substantially vertical cam portion (154 and 156 respectively) with a double bend in which the guide roller 146 engages. When the needle carrier 72 is moved up and down, the control lever 144 is therefore pivoted outwardly relatively to the needle carrier axis shortly before each reversal of movement, and the winding needles 108, driven through the lever 138, the square element 130, the push rod 128, and the levers 124, are spread apart.

The pivoting movement of the winding needle 108 may be adapted to the length of the stator sheet stack to be wound and to other operational necessities, due to the axial displaceability of the cam plates 148, 150 which are provided with mutually engaging raised portions which define the control cam 154, 156 in the space between the plates. Indicator elements 158, 160, fixedly attached to the depending frame 100, in conjunction with calibrations on the outside of the cam plates, enable the immediate resetting of plate positions, previously ascertained to be suitable for certain operational conditions.

The form formed by the extensions 112, engages one end of an actuating lever 164 provided with a slot 162 extending substantially in horizontal direction, for driving the needle carrier 72, said one end being connected to the latter by means of a roller pin 166 extending into the slot 162, so as to be pivotable and displaceable longitudinally of the actuating lever 164.

As may be seen in FIGURE 6, the other end of the actuating lever 164 is provided with a slot 168 in which a drive roller 170 engages which is rotatably supported on one flat side of a driven slide 174 vertically guided between guide rollers 172.

The actuating lever is pivotally supported, somewhat off-centre, on a pin 176 which extends through a setting fork 178 embracing the actuating lever from above. The setting fork 178 is guided by its flange-like widened bridge portion on a fixed adjustment base 180 so as to be movable in the pivoting plane of the actuating lever, and up and down an inclined level and may be displaced within predetermined limits and fastened to the adjustment base 180 in any desired intermediate position by means of set screws 182. Accurate setting of the pivot for the actuating lever 164 relative to the machine frame is made possible by a threaded spindle 184 rotatably supported in a recess of the adjustment base, in conjunction with a threaded block 186 rotatably guided in the recess of the adjustment base 180, said block positively engaging the setting fork with a tenon, the setting operation being effected when the set screws 182 are loosened, by means of a milled nut 187 non-rotatably attached to the threaded spindle, whereby the lever arm ratio of the actuating lever 164 is varied and the stroke of the needle carrier 72 becomes adjustable while the displacement of the driven slide 174 remains constant. Owing to the fact that the setting fork 178 is obliquely guided up and down on the adjustment base 180 in the same direction as the longitudinal axis of symmetry of the actuating lever 164 when the needle carrier is in its lower dead-centre position, as becomes apparent from FIGURE 6, this dead centre position always remains unchanged when the pivot 176 is adjusted and the stroke of the needle carrier is only varied in the upward direction.

As may be seen in FIGURE 7, the driven slide 174 is provided, on its other flat side, with a rotatable guide roller 188 which engages a guide cam on the outer surface of a guide cam disc 190 for effecting movement of the needle carrier 72. This guide cam is shaped in such a way that the needle carrier 72 during each revolution of the cam disc 190 executes a vertical reciprocating movement with a delay in the dead-centre positions.

Figure 8:
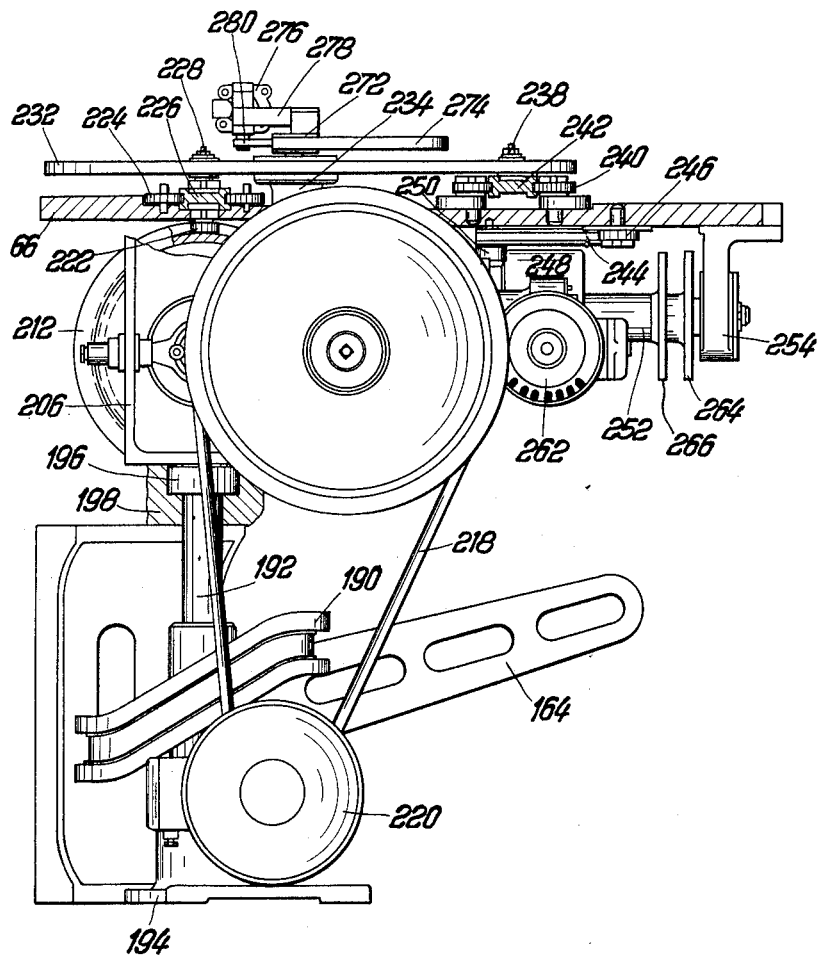
FIGURE 8 is a part-sectional side elevation of the drive mechanism for the winding machine.
Figure 9:
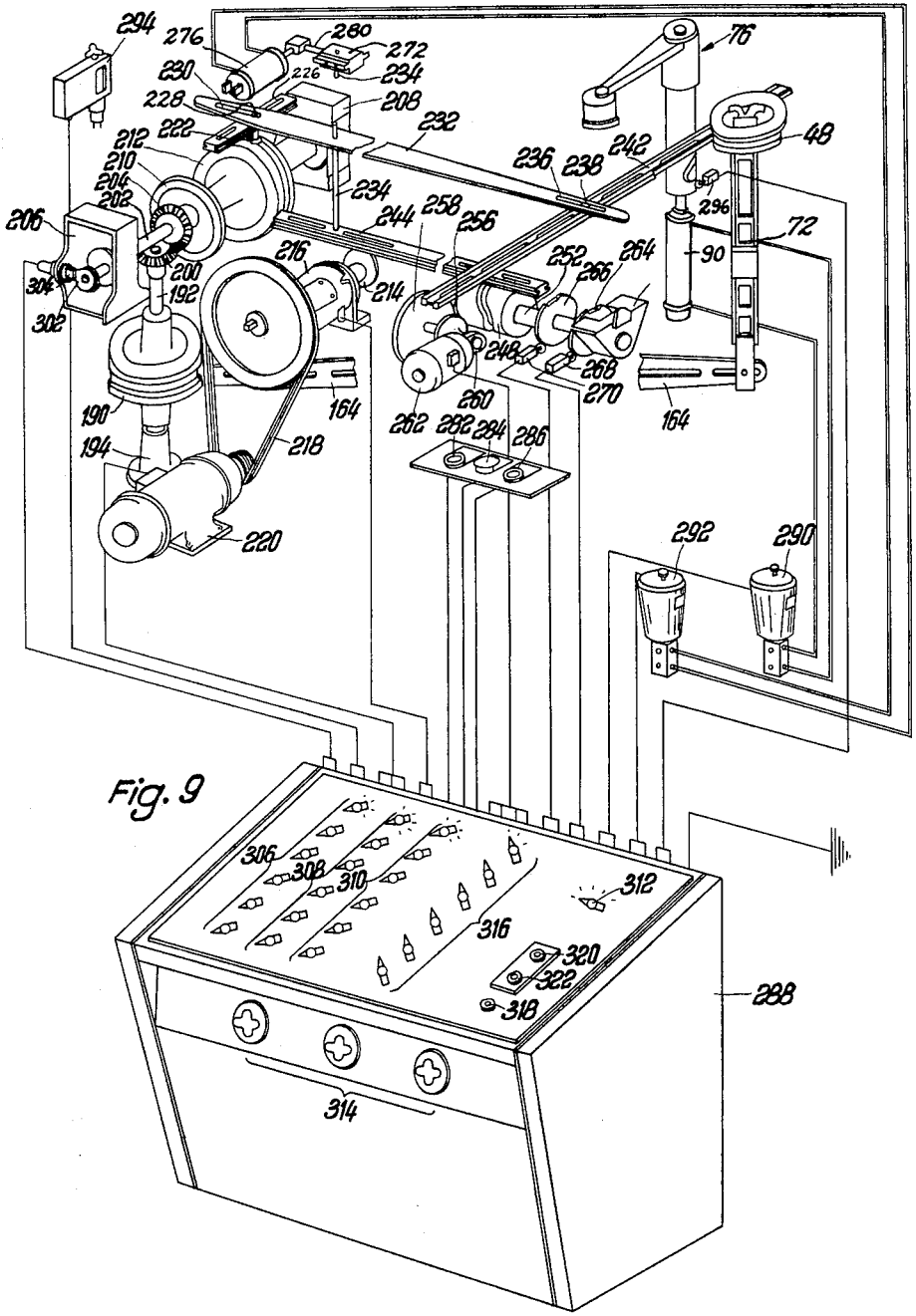
FIGURE 9 is a simplified perspective representation of the drive mechanism for the winding machine, with the control desk containing the electronic control system for the machine.

The guide cam disc 190 is supported on a vertical shaft 192 which is rotatably supported at its lower end in a stand 194 by means of a roller bearing 195, and above the cam disc 190, by means of a roller bearing 196 provided in a fixed intermediate plate 198 of the machine frame (FIGURE 8). At the upper end of the shaft 192 a bevel gear 200 is arranged which meshes with a bevel gear 204 fitted to a horizontal main shaft 202 (FIGURE 9). The main shaft 202 is supported in bearings 206 and 208 which are inserted between the intermediate plate 198 and the machine bench 66 and screw-connected to these plates.

In addition to the bevel gear 204, the main shaft 202 is provided with a spur gear 210 (FIGURE 9) and a second cam disc 212 which is shaped in the same way as the cam disc 190. As can be seen from FIGURE 10, the spur gear 210 meshes with a spur gear 214 on the driven shaft of an electro-magnetically actuatable brake coupling 216, known per se, whose drive shaft is continually driven by a V-belt 218 and an infinitely variable speed electric motor 220 when the winding machine is in operation. For clarity's sake, the spur gears 210 and 214, which mesh with one another, are shown spaced apart in FIGURE 9.

The guide cam of the cam disc 212 is engaged by a guide roller 222 which is rotatably supported on a driven slide 226, the latter being supported between guide rollers 224 so as to be displaceable axially of the main shaft 202 (FIGURE 10). The driven slide 226 is provided on its upper side with a rotatably supported actuating roller 228 which engages a slot 230 at one end of an actuating lever 232 for the rotation of the stator sheet stack through one winding step width, said actuating lever extending substantially transversely of the driven slide 226. The lever 232 is pivotably supported somewhat off-centre on a vertical shaft 234 and has at its other end; a second slot 236 in which engages an actuating roller 238 on the upper side of an actuating slide 242 which is guided between stationary guide rollers 240 in a direction parallel with the driven slide 226. One end of the actuating slide 242 is formed as a rack and with its teeth engages the teeth of the ring gear 48.

The pivot 234 of the actuating lever 232 which effects the rotation of the stator sheet stack through one winding step width is supported by a setting bar 244 which is displaceably supported between stationary guide rollers 246 at right angles to the driven slide 226 and the actuating slide 242. The slots 230 and 236 in the actuating lever 232 are adapted to a predetermined displacement range of the setting bar 244. A displacement of the setting bar 244 allows variation, in a manner still further to be described, of the transmission ratio between the thrust movements of the actuating slide 242 and the driven slide 226, and thus of the winding step width of the stator sheet stack, in a similar manner as in the case of the needle carrier stroke and the actuating lever 164.

The displacement and setting of the bar 244 is effected automatically according to a predetermined program by means of a drum-shaped cam 248 arranged below the setting bar (FIGURES 9 and 10), the drum being provided on its outer surface with a guide cam in which a guide roller 250 (FIGURE 8), fitted to the underside of the setting bar 244, engages positively. The drum-shaped cam 248 is interchangeable. Its guide cam is composed of a plurality of cam sections displaced relatively to one another in the peripheral and axial directions and extending at right angles to the drum axis, said sections being connected to one another by intermediate sections extending obliquely to the roller axis. Thus, uniform rotation of the drum-shaped cam 248 results in an intermittent displacement of the setting bar 244, and those cam sections which extend at right angles to the drum axis will determine the winding step width.

The drum-shaped cam 248 is fitted to a control shaft 252 whose ends are supported in bearings 254 fixed to the underside of the machine bench 66 (only one bearing is shown in FIGURES 8 to 10). On the control shaft 252 a spur gear 256 is provided which meshes with a spur gear 258 on the driven shaft of a reduction gear 260 rotated by a servo-motor 262. The control shaft 252 also has two cam discs 264 and 266 each of which cooperates with a limit switch, 268 and 170 respectively, as will hereinafter be explained in further detail.

The upper end of the pivot 234 is fitted to a slide block 272 which is guided between guide plates 274, 275 fixed to the machine bench 66 so as to slide in the direction of displacement of the setting bar 244 and which can be fixed against these guide plates by means of pneumatically actuatable clamp jaws. The clamp jaws are locked and released by a two-way pneumatic piston drive 276 having a housing fixed to an arm 278 of the slide block and displaceable therewith, and a piston rod which acts upon an actuating lever 280 for the clamp jaws.

In operation of the winding machine, the wire strands 120 arriving from the supply drums are fed through the bores 116, 118 of the wire guide 114 and threaded into the needle head 102 through the guide grooves 122, in radial direction, and outwardly into the needle eyes 110. The projecting wire ends are fixed between the projections 60 and the flat springs 62. While this is done, the main switch of the machine (not shown), may already be switched or whereby the drive motor 220 is caused to run with the brake coupling disengaged, and the holding-down device 76 is moved upwardly and swung sideways. At the same time, the drum-shaped cam 248 is in a rotary position such that the effective lever arm of the actuating lever 242 which extends towards the actuating slide 242, is set for minimum length.

Should this condition not yet have been brought about, it can be produced by operation of a homing key 282 which is provided beside an emergency stop key 284 and a start key 286 on the machine bench and connected to an electronic control system, not shown in detail, in the control cabinet 288. Depression of the homing key 282 actuates an electrically actuatable magnetic valve 290 for the pneumatic piston drive 90 of the holding-down device 76 whereby the latter is lifted and swung sideways while, at the same time, the servo-motor 262 is reversed and runs, until, in the desired initial position of the drum-shaped cam 248, the end switch 268 is operated to the disconnect position by the cam disc 264. By means of suitable auxiliary contacts of the motor contactor in the control cabinet 288, a second magnetic valve 292 is connected to the servo-motor 262 in such a way that, when the servo motor 262 is switched on, the clamp jaws on the slide block 272 are always released whereas, when the servo-motor is disconnected, these jaws will always fix the slide block, and therefore the pivot 234, to the stationary guide plates 274, 275. A pressure control device 294 checks the working pressure available for the penumatic drives and interrupts electronic actuation if this pressure falls or is inadequate.

Now the stator jig 10 including the stator sheet stack 16 which is to be wound, the support ring 24 and the winding finger segments 30 is placed upon the actuating disc 40, and the start key 286 is depressed. This reverses the magnetic valve 290 and causes the holding-down device 76 to be swung in and to be lowered on to the stator jig whereupon the pressure elements 86 resiliently engage the upper part 14, without however preventing a rotary movement of the stator jig relative to the pressure head 84 which is non-rotatably connected to the arm 82.

When the holding-down device has reached its lower end position a suitable projection on the sleeve 78 actuates a limit switch 296 which releases the brake in the brake coupling 216 and engages the coupling so that the main shaft 202, and thus the vertical cam disc shaft 192, start rotating. Consequently, the cam disc 190 and 212, fitted to the shafts 192 and 202, cause, with their guide cams and by means of the driven slides 174 and 226, the up and down movement of the actuating lever 164 and the pivoting movement in both directions of the actuating lever 232 whereby, in one case, the needle carrier 72 is moved up and down and, in the other case, the ring gear 48 with the actuating disc 40 and the stator jig 10 is rotated in alternate directions.

As has already been mentioned in connection with the description of the cam disc 190, the shape of the mutually identical guide cams of the cam discs 190 and 212 is such that the alternating movements of the components driven by them are delayed in the dead-centre positions, that is to say interrupted during a cam disc rotation of approximately 90°. In addition, the guide cams of the two drums are so arranged relatively to one another that the phases of movement and the phases of rest of the components driven by one cam disc are displaced by a quarter-rotation relative to the identical phases of the components driven by the other cam disc. Thus, during the up and down movement of the needle carrier 72, no rotation of the stator jig 10 with the stator sheet stack contained therein takes place during each rotation of the stator jig 10 the needle carrier 72 rests either in the lower or in the upper dead-centre position.

The winding operation now commences and will be described in more detail with reference to FIGURES 11 and 12. The starting point is to be the end of the dead-centre phase of the needle carrier 72 (FIGURE 11a) when the winding needles 108, due to the above described fact that the guide roller 146 is guided in the control cam 154, 156 of the cam plate 148 and 150, are spread apart and away from one another below the downwardly pointing winding fingers and, in this position, are situated with their bent end portions in the slots provided in the sleeve portion of the inset 70. Due to the guide pins 20, the stator sheet stack 16 is poistioned relative to the winding needles 108 in such a way that, always provided that the rotary movement of the stator jib 10 has terminated, the bent end of each winding needle is aligned with a stator slot 36. When the upward movement of the needle carrier commences, the winding needles 108 are pivoted inwardly relative to the needle head 102 (FIGURE 11b) to such an extent that, during continued upward movement, their free ends radially penetrate the stator slots 36, with which they are aligned, by a small amount, i.e. perhaps the thickness of the slot wedges later to be fitted. In this inwardly pivoted position the winding needles 108 are guided through the stator slots in axial direction whereby the wire strand 120 which issues from each needle eye 110 is placed into the associate slot (FIGURE 11c).

After emerging from the slots (FIGURE 11d), the needles 108, owing to the influence exercised by the control cams 154, 156 in the cam plates 148, 150, again spread outwardly in radial direction whereby the bent end portions of the winding needles pass outwardly through the slots in the pressure head 84 and pull the wire strands, placed in the slots, against the bottom of the slot, or against layers of wire already present therein. In the end position of the upward needle carrier movement (FIGURE 11e), the bent needle ends assume a position such that they will no longer hinder the rotation, now commencing, of the stator sheet stack (FIGURE 11f) together with the winding fingers, as becomes apparent especially from FIGURE 13.

Under the influence of the rotating cam disc 212 the stator jig 10 is now rotated, together with the sheet stack 16 and the crown of winding fingers 34, through an angle determined by the position of the setting bar 244 which corresponds to the width of the innermost coil in the case of the most usuall windings comprising a plurality of coils of different width for each pole. In this way the slot 36 shown at the left hand side of FIGURE 14 vertically below the winding needle 108 and from which the threaded wire extends towards the needle eye 110, is rotated through an arc relative to the stationary winding needle 108 and the wire strand 120 at the left hand side of FIGURE 14 is pulled so that it extends downwardly obliquely to the right. During this movement the wire strand is caught by the wire deflector 74 provided at the lower end of the pressure head 84 and laid around the winding fingers (not shown in FIGURE 14) over which the winding needle travels during rotation, the strand sliding downwardly on these fingers during the subsequent downward movement of the needle carrier 82 and forming the coil end immediately adjacent the bend of the winding fingers.

The wire deflector 74 illustrated in FIGURES 13 and 14 is particularly suited for the large winding step widths in the case of two-pole stator sheet stacks. It comprises a circular-ring sector 298 of substantially rectangular or square cross section, screwed to the lower end face of the pressure head 84 and the upper end face of the collar-like inset 70 respectively, and a bar 300 arranged on the free end face of said sector and in axially spaced relationship therewith and curved substantially concentrically therewith, its axially bent ends being inserted in bores on the free end face of the circular-ring sector 298. That end of the circular-ring sector which meets the wire first is tapered on the outside and rounded at the edge between the outer face and the free end face. Accordingly, that bar end which is situated in this location is inserted in the circular-ring sector in a position further removed inwardly in radial direction than the other bar end so that the wire, when increasingly pulled to the right (see FIGURE 14) is at the same time increasingly urged outwardly at the point where it meets the bar. In this way, the correct formation of a coil end is also ensured when the winding step is wide.

Where the winding step is shorter, as is usually the case in machines with four or more poles, the bar 300 may be dispensed with, and the circular-ring sector may be shorter, in accordance with the shorter winding step.

During the subsequent downward movement of the needle carrier 72 (starting from FIGURE 12a), the winding needles are again pivoted inwardly (FIGURE 12b) and lead the wire through the slots along which they travel (FIGURE 12c). When emerging from the lower slot ends (FIGURE 12d) the winding needles spread outwardly again and will again assume a position such that they cannot impede the winding fingers during the subsequent rotation of the stator jig (FIGURE 12e).

Thereupon the stator jig 10 is rotated under the influence of the cam disc 212 by the same amount but in the opposite direction to the above mentioned rotary movement (FIGURE 12f), until the winding needles 108 are again aligned with the formerly wound slots during which movement the wire strands are placed around the lower winding fingers 34 traversed by the winding needles, by means of the wire deflectors 74 supported by the collar-like inset 70, and the first turn is closed. Now the upward movement of the needle carrier 72 commences again, and the wire strands are again pulled through the formerly wound slots, are laid around the upper winding fingers and, after the predetermined winding step width has been traversed, are led down through the other slots and again laid around the lower winding fingers. This cycle is repeated in accordance with the desired number of turns for the coil to be placed in the slots.

To enable automatic control of the desired number of turns, a tab-like cam 302 is arranged on the main shaft 202 which, during each revolution of the main shaft, traverses the metering gap of an electronic transmitter 304 and thus sends a counting pulse to the electronic control system in the control desk 288. On the control desk 288 there are six groups of three pre-selectors 306, 308, 310, each with 10 switching positions, by means of which the desired turn numbers for a maximum of six concentric coils for each pole can be preselected with different winding step widths and different numbers of turns up to 999 turns per coil. The switches 306 serve for setting the hundreds, the switches 308 for setting the tens, and the switches 310 for setting the units for a particular number of turns.

The electronic control system is arranged in such a way that the brake clutch 216 is automatically actuated when the number of counting pulses transmitted from the electronic transmitter 304 is equal to that which was preselected in the first switching group 306, 308, 310 whereby the winding movement is interrupted. At the same time the magnetic valve 292 is changed over to effect loosening the clamp jaws on the slide block 272 so that clamping of the pivot 234 terminates and the servo motor 262 receives a voltage pulse which it is started and begins to rotate the control shaft 252, with the drum-shaped cam 248. Due to the rotation of the control shaft 252, the cam disc 266 is rotated and actuates the limit switch 270 which maintains the supply of a voltage to the servo motor 262, until the drum-shaped cam 96 has reached a position corresponding to the next winding step, as regards the engagement of the guide roller, and thus the pivot 234 has assumed its new position in accordance with the next-following winding step.

The cam disc 266 is so shaped and arranged that, in this position, it terminates the actuation of the limit switch 270 whereby the servo motor 262 is disconnected and the magnetic valve 292 changed over to clamping so that the pivot 234 is again fixed in its new position. At the same time, the brake coupling 216 engages again and the winding of a second coil in the stator sheet stack commences, with a winding step width enlarged in both directions. In this process, the counting pulses transmitted by the electronic device 304 are automatically alotted to the next-following group of pre-selectors 306, 308, 310 so that the second coil may be given a desired number of turns different from the first-wound coil.

The winding of coils in the stator sheet stack, with the intervening alteration of the winding step width, is continued, until all concentric coils of the poles which must be wound have been formed in the sheet stack. In order to avoid that, in a case where the desired number of coils is below six, all the five intervening winding step change-overs are effected automatically, a program termination switch 312 with six positions is provided on the control desk 288 by means of which the alteration of step width is interrupted when a set number of coils has been wound. At the same time, the magnetic valve 290 for the holding-down device 76 is actuated and the latter is moved upwardly while its arm 82 is swung simultaneously, so that the stator jig 10 with the wound stator sheet stack 16 can be removed from the actuating disc 40. At the same time the setting bar 244 returns to the initial position, due to the reverse movement of the servo motor 262, and the counting mechanism in the electronic control system is rendered inoperative.

On the machine bench may be arranged a pneumatically actuable wire cutter (not shown), known per se, for severing the coil ends from the wire strands 120 led through the needle eyes 110, said cutter being preferably actuated by means of a foot switch and a further electromagnetically actuatable pneumatic valve (not shown), independently of the electronic control system.

On the front side of the control desk 288 which faces the operator, three speed preselectors 314 are arranged by means of which three different speeds for winding the stator sheet stack may be preselected with infinite variability. These may be allocated to the individual winding step widths by means of six speed allocation switches 316, so that the two inner coils, for example, may be wound at great speed, the two intervening coils at medium speed, and the two outer coils at low speed.

Finally, there are arranged on the control desk 288 a further emergency stop key 318 and, for setting purposes, a key-operated switch 320 for the swinging in and lowering of the holding-down device 76 and for disengaging the brake section of the brake coupling, without the latter being engaged, and also a step width alteration key 322 which only influences the servo motor 262 and the clamping of the pivot 234. When the setting operations have been completed, the homing key 282 is actuated which has already been described earlier, whereby the holding down device 76 returns to its non-operative position, the drum-shaped cam 248 is turned back to its initial position, and the counting mechanism in the electronic control system is rendered inoperative. The machine will then be ready for winding another stator sheet stack.

The invention is not limited to the embodiment illustrated in the drawings. For example it is possible to provide the needle carrier with four or more winding needles distributed over the periphery of the need head, and other modifications are also possible within the scope of the appended claims.

We claim:

1. Apparatus for mechanically winding slotted stator sheet stacks for electrical machines, comprising means to mount a stator sheet stack for turning movement about the central axis thereof, a carrier mounted for movement along such axis, at least one wire guiding member, means mounting the member on the carrier for movement away from and towards such axis, and operating means operatively connecting the stack mounting means, the carrier and the member, said operating means including means for withdrawing the member towards the axis and moving the carrier axially through the stack mounting means while the stack mounting means it stationary in such a position that the member passes through one of the slots, and means for moving the member away from the axis after it has passed the stack mounting means, means for then turning the stack mounting means in one direction by a predetermined amount while the member is stationary, means for then withdrawing the member axially towards the axis and moving the carrier back through the stack mounting means in the opposite direction to move the member through another of the slots while the stack mounting means remains stationary and means for then turning the stack mounting means in the opposite direction by a predetermined amount while the member remains stationary, said stack mounting means comprising a ring, and a plurality of spaced guide fingers removably mounted on each face of the ring and extending axially therefrom, said guide fingers being located in the areas between the slots of an article carried by said ring, said operating means moving the members further from the axis than said fingers, all said guide fingers being substantially identical and substantially identically positioned with respect to the ring and being rigidly held in position during winding, a guide having a substantially circular guide surface having one end slightly closer to the axis of the ring than the other end, means fixedly mounting said guide at one side of the ring radially outside the path of turning of the ends of the fingers and axially closer to the ring than such ends, for engagement with threads during turning of the ring from one slot to another, said stack mounting means comprising a ring holder adapted to receive and hold the stack against rotation therein, a cup having means thereon to receive the ring holder and stack and to hold the stack against rotation with respect thereto, means to turn said cup alternately in opposite directions about its central axis, and an annular top plate engageable with the fingers on the upper side of the stack, said fingers having outwardly directed flat sections at their inner ends engaging the opposite faces of the stack and angular portions extending from each such face towards the other face along the outer periphery of the stack, the angular portions of the fingers on one face of the stack interlocking with the angular portion of the fingers on the other face of the stack, one of said angular portions having a notch therein, said ring being adapted to be positioned between said angular portions and the stack and having an outward projection engageable in said notch.

2. Apparatus for mechanically winding slotted stator sheet stacks for electrical machines, comprising means to mount a stator sheet stack for turning movement about the central axis thereof, a carrier mounted for movement along such axis, at least one wire guiding member, means mounting the member on the carrier for movement away from and towards such axis, and operating means operatively connecting the stack mounting means, the carrier and the member, said operating means including means for withdrawing the member towards the axis and moving the carrier axially through the stack mounting means while the stack mounting means is stationary in such a position that the member passes through one of the slots, and means for moving the member away from the axis after it has passed the stack mounting means, means for then turning the stack mounting means in one direction by a predetermined amount while the member is stationary, means for then withdrawing the member axially towards the axis and moving the carrier back through the stack mounting means in the opposite direction to move the member through another of the slots while the stack mounting means remains stationary and means for then turning the stack mounting means in the opposite direction by a predetermined amount while the member remains stationary, said stack mounting means comprising a ring, and a plurality of spaced guide fingers removably mounted on each face of the ring and extending axially therefrom, said guide fingers being located in the areas between the slots of an article carried by said ring, said operating means moving the members further from the axis than said fingers, all said guide fingers being substantially identical and substantially identically positioned with respect to the ring and being rigidly held in position during winding, a guide having a substantially circular guide surface having one end slightly closer to the axis of the ring than the other end, means fixedly mounting said guide at one side of the ring radially outside the path of turning of the ends of the fingers and axially closer to the ring than such ends, for engagement with threads during turning of the ring from one slot to another, said fingers having outwardly directed flat sections at their inner ends engaging the opposite faces of the stack and angular portions extending from each such face towards the other face along the outer periphery of the stack, the angular portions of the fingers on one faces of the stack interlocking with the angular portion of the fingers on the other face of the stack.

3. Apparatus for mechanically winding slotted stator sheet stacks for electrical machines, comprising means to mount a stator sheet stack for turning movement about the central axis thereof, a carrier mounted for movement along such axis, at least one wire guiding member, means mounting the member on the carrier for movement away from and towards such axis, and operating means operatively connecting the stack mounting means, the carrier and the member, said operating means including means for withdrawing the member towards the axis and moving the carrier axially through the stack mounting means while the stack mounting means is stationary in such a position that the member passes through one of the slots, and means for moving the member away from the axis after it has passed the stack mounting means, means for then turning the stack mounting means in one direction by a predetermined amount while the member is stationary, means for then withdrawing the member axially towards the axis and moving the carrier back through the stack mounting means in the opposite direction to move the member through another of the slots while the stack mounting means remains stationary and means for then turning the stack mounting means in the opposite direction by a predetermined amount while the member remains stationary, said stack mounting means comprising a ring, and a plurality of spaced guide fingers removably mounted on each face of the ring and extending axially therefrom, said guide fingers being located in the areas between the slots of an article carried by said ring, said operating means moving the members further from the axis than said fingers, all said guide fingers being substantially identical and substantially identically positioned with respect to the ring and being rigidly held in position during winding, a guide having a substantially circular guide surface having one end slightly closer to the axis of the ring than the other end, means fixedly mounting said guide at one side of the ring radially outside the path of turning of the ends of the fingers and axially closer to the ring than such ends, for engagement with threads during turning of the ring from one slot to another, said cup turning means including an actuating disc below the cup having upwardly extending jaws engageable with the outside of the cup for centering the same, a device engageable with the top plate to press it towards the disc, an arm carrying said device and means mounting said arm for swinging movement about an axis parallel to the axis of rotation of the holding means and for movement in the direction of such axis, said device including resiliently mounted rollers engageable with said top plate.

References Cited by the Examiner

UNITED STATES PATENTS

| | | | |
|---|---|---|---|
| 2,579,585 | 12/1951 | Klinkseik | 242—1.1 |
| 2,770,424 | 11/1956 | Grove | 242—1.1 |
| 2,904,269 | 9/1959 | Eminger | 242—1.1 |
| 2,904,270 | 9/1959 | Nill | 242—1.1 |
| 3,082,966 | 3/1963 | Frederick | 242—1.1 |

FOREIGN PATENTS

| | | |
|---|---|---|
| 132,660 | 6/1949 | Australia. |
| 565,557 | 3/1958 | Belgium. |
| 685,121 | 12/1952 | Great Britain. |

MERVIN STEIN, *Primary Examiner.*

RUSSELL C. MADER, *Examiner.*